United States Patent
Baek et al.

(10) Patent No.: US 9,835,518 B2
(45) Date of Patent: Dec. 5, 2017

(54) VIBRATION TEST JIG

(71) Applicants: Hyundai Motor Company, Seoul (KR); Kia Motors Corporation, Seoul (KR); Inalfa Roof Systems Group B.V., AB Venray (NL)

(72) Inventors: Kyung Wook Baek, Seoul (KR); Dae Jin Kim, Osan-si (KR); Hwa Kyong Sung, Hwaseong-si (KR); Joo Hoon Lim, Suwon-si (KR)

(73) Assignees: Hyundai Motor Company, Seoul (KR); Kia Motors Corporation, Seoul (KR); Inalfa Roof Systems Group B.V., Venray (NL)

( * ) Notice: Subject to any disclaimer, the term of this patent is extended or adjusted under 35 U.S.C. 154(b) by 561 days.

(21) Appl. No.: 14/483,022

(22) Filed: Sep. 10, 2014

(65) Prior Publication Data

US 2015/0185108 A1 Jul. 2, 2015

(30) Foreign Application Priority Data

Dec. 31, 2013 (KR) ........................ 10-2013-0168314

(51) Int. Cl.
```
G01M 7/00      (2006.01)
G01M 7/02      (2006.01)
G01M 7/04      (2006.01)
G01M 7/06      (2006.01)
G01M 17/04     (2006.01)
```
(52) U.S. Cl.
CPC .............. *G01M 7/027* (2013.01); *G01M 7/02* (2013.01); *G01M 7/022* (2013.01); *G01M 7/025* (2013.01); *G01M 7/04* (2013.01); *G01M 7/06* (2013.01); *G01M 17/04* (2013.01)

(58) Field of Classification Search
CPC ...................................................... G01M 7/027
USPC ......... 73/662, 663, 664, 665, 666, 667, 668, 73/669
See application file for complete search history.

(56) References Cited

U.S. PATENT DOCUMENTS

| | | | |
|---|---|---|---|
| 4,068,825 A | | 1/1978 | Macpherson |
| 4,313,347 A | * | 2/1982 | Hull ........................ G01M 7/04 73/669 |
| 4,862,737 A | * | 9/1989 | Langer .............. G01M 17/0074 73/116.07 |

(Continued)

FOREIGN PATENT DOCUMENTS

| | | | | |
|---|---|---|---|---|
| CN | 202110061 U | * | 1/2012 | ............ G01M 13/00 |
| JP | 2000-266533 A | | 9/2000 | |

(Continued)

*Primary Examiner* — R. A. Smith
*Assistant Examiner* — Herbert K Roberts
(74) *Attorney, Agent, or Firm* — Morgan, Lewis & Bockius LLP (57) ABSTRACT

A vibration test jig may include an upper jig frame to which a vibration test object is fixed and a lower base frame mounted to an oscillator, and a plurality of double parallelograms connected between the jig frame and the base frame, for generating displacements in an upward/downward direction and/or a forward/rearward direction. Each of the double parallelograms may include a complex four-articulation link structure and a wire rope isolator. The vibration test jig can simulate a deformation mode due to generation of resonances.

8 Claims, 5 Drawing Sheets

(56) References Cited

U.S. PATENT DOCUMENTS

| | | | | |
|---|---|---|---|---|
| 5,465,615 A * | 11/1995 | Petersen | G01M 13/027 | 73/115.07 |
| 5,572,440 A * | 11/1996 | Harashima | G01M 7/06 | 700/280 |
| 5,610,330 A * | 3/1997 | Fricke | G01M 7/022 | 73/146 |
| 5,655,836 A * | 8/1997 | Preston | B01F 11/008 | 366/208 |
| 6,098,969 A * | 8/2000 | Nagarajaiah | F16F 13/00 | 248/550 |
| 6,419,203 B1 | 7/2002 | Dang | | |
| 6,640,638 B1 * | 11/2003 | Haeg | G01M 17/04 | 73/116.01 |
| 6,860,156 B1 * | 3/2005 | Cavallaro | G01N 3/08 | 73/813 |
| 7,146,859 B2 * | 12/2006 | Dittmann | G01M 13/027 | 73/669 |
| 2002/0157477 A1 * | 10/2002 | Hanson | G01L 1/162 | 73/788 |
| 2004/0230394 A1 * | 11/2004 | Saari | G01M 7/06 | 702/113 |
| 2006/0059993 A1 * | 3/2006 | Temkin | G01M 17/007 | 73/669 |
| 2007/0044546 A1 * | 3/2007 | Parison | G01M 7/04 | 73/117.01 |
| 2008/0078250 A1 * | 4/2008 | Nelsen | G01M 17/007 | 73/666 |
| 2013/0104670 A1 * | 5/2013 | Saari | G01L 5/0052 | 73/862.381 |
| 2015/0308921 A1 * | 10/2015 | Warmerdam | G09B 9/00 | 73/663 |
| 2015/0323415 A1 * | 11/2015 | In | G01M 17/007 | 73/11.04 |
| 2016/0076966 A1 * | 3/2016 | Khulief | G01M 7/06 | 73/663 |

FOREIGN PATENT DOCUMENTS

| | | | |
|---|---|---|---|
| KR | 10-2001-0059296 A | 7/2001 | |
| KR | 10-2006-0131600 A | 12/2006 | |
| KR | 10-2010-0046686 A | 5/2010 | |
| KR | 10-12235310000 B1 | 1/2013 | |
| KR | 101223531 B1 * | 1/2013 | F16F 15/02 |

* cited by examiner

VIBRATION TEST JIG

CROSS-REFERENCE TO RELATED APPLICATION

The present application claims priority of Korean Patent Application No. 10-2013-0168314 filed on Dec. 31, 2013, the entire contents of which application are incorporated herein for all purposes by this reference.

BACKGROUND OF INVENTION

Field of Invention

The present disclosure relates to a vibration test jig, and more particularly to a vibration test jig used to simulate a relative displacement such as torsion or bending of a vehicle part including a panorama sunroof in a vibration environment.

Description of Related Art

In general, repeated vibrations transferred from a road surface or a driving part of a vehicle such as an engine during driving of the vehicle are transferred to a vehicle body, and a part such as the vehicle body or a sunroof is deformed by repeated transfers of the vibrations.

Since the deformation causes an aperture or a step which in turn causes leakage of water or lowering of an external appearance, a process of securing quality by measuring a relative displacement such as torsion or bending through a vibration test before the design is actually applied to a vehicle is performed.

For example, a mode analysis test is performed on a vibration test object such as a vehicle body, a door, and a panorama sunroof by providing vibrations while the vibration test object is fixed to a jig and installing a plurality of sensors such as vibration test accelerometers at portions of the vibration test object.

A jig is generally used as a means for fixing an object during a vibration test, and various forms of vibration test jigs are disclosed in Korean Patent Application Publication No. 10-2006-0131600, Korean Patent Application Publication No. 2001-0059296, Korean Patent No. 10-1014364, and Japanese Patent Application Publication No. 2000-266533.

According to the related art, a fixed jig is used as a means for measuring a relative displacement such as torsion or bending of a vibration test object such as a panorama sunroof. That is, torsion or bending (a relative displacement) is generated in a panorama sunroof in an actual vehicle condition, that is, when a vehicle is drive, and a fixed jig is used as a means for simulating the relative displacement with actual vehicle vibrations.

However, when the fixed jig according to the related art is used, a single product test result and an actual vehicle test result are different. Accordingly, there is a limit in simulating a relative displacement such as torsion or bending introduced in an actual panorama sunroof by the fixed jig.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made in an effort to solve the above-mentioned problems and/or other problems, and the present invention is directed to provide a vibration test jig which realizes a new form of vibration test jig for generating torsion while causing a relative displacement in a vertical direction and restricting a displacement in another direction by installing a displacement causing and displacement restricting unit including a complex four-articulation link and a spring at a lower end of the jig to which an object for a vibration test is fixed, so that a vibration test can be accurately performed as in an actual vehicle condition, for example, a relative displacement such as torsion or bending introduced into an actual vehicle can be accurately simulated by vibrations of the actual vehicle.

The vibration test jig of the present invention has at least the following features.

In accordance with various aspects of the present disclosure, there is provided a vibration test jig including: an upper jig frame to which a vibration test object is fixed and a lower base frame mounted to an oscillator; and a plurality of double parallelograms connected between the jig frame and the base frame, for generating displacements in an upward/downward direction and/or a forward/rearward direction, each of the double parallelograms including a complex four-articulation link structure and a wire rope isolator, wherein a deformation mode due to generation of resonances is simulated.

Each of the double parallelograms may include an upper plate coupled to the jig frame, a lower plate fixed to the base frame, the complex four-articulation link structure that includes a pair of four-articulation links connected to the upper and lower plates through pins while being disposed forwards and rearwards between the upper plate and the lower plate and being bent at a predetermined angle in the same direction, a stabilizer bar connected to the forward/rearward four-articulation links through a pin structure by using two link sharing units, and the wire rope isolator connected between the upper plate and the lower plate.

The upper plate may include a dummy mass supporting the jig frame. Intermediate lengthwise portions of link bars forming the four-articulation links may be connected by an adjustor to adjust lengths of the link bars. Two rows of stabilizer bars which are spaced apart while surrounding the wire rope isolator may be provided to prevent interference when the wire rope isolator located at a center portion of the stabilizer bars is compressed. Wire rope mounting members for mounting the wire rope isolators may be provided in the upper plate and the lower plate, and the wire rope mounting members may be inclined.

The plurality of double parallelograms between the jig frame and the base frame may be disposed to be substantially perpendicular to a diagonal line passing through a center of weight of the vibration test jig, and are disposed to the contrary with respect to a forward/rearward direction.

Since the vibration test jig according to the present disclosure can simulate a relative displacement such as torsion or bending introduced in an actual vehicle condition during driving of a vehicle through a combination of a complex four articulation link and a spring, a vibration test can be accurately performed in the same condition as an actual travel of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
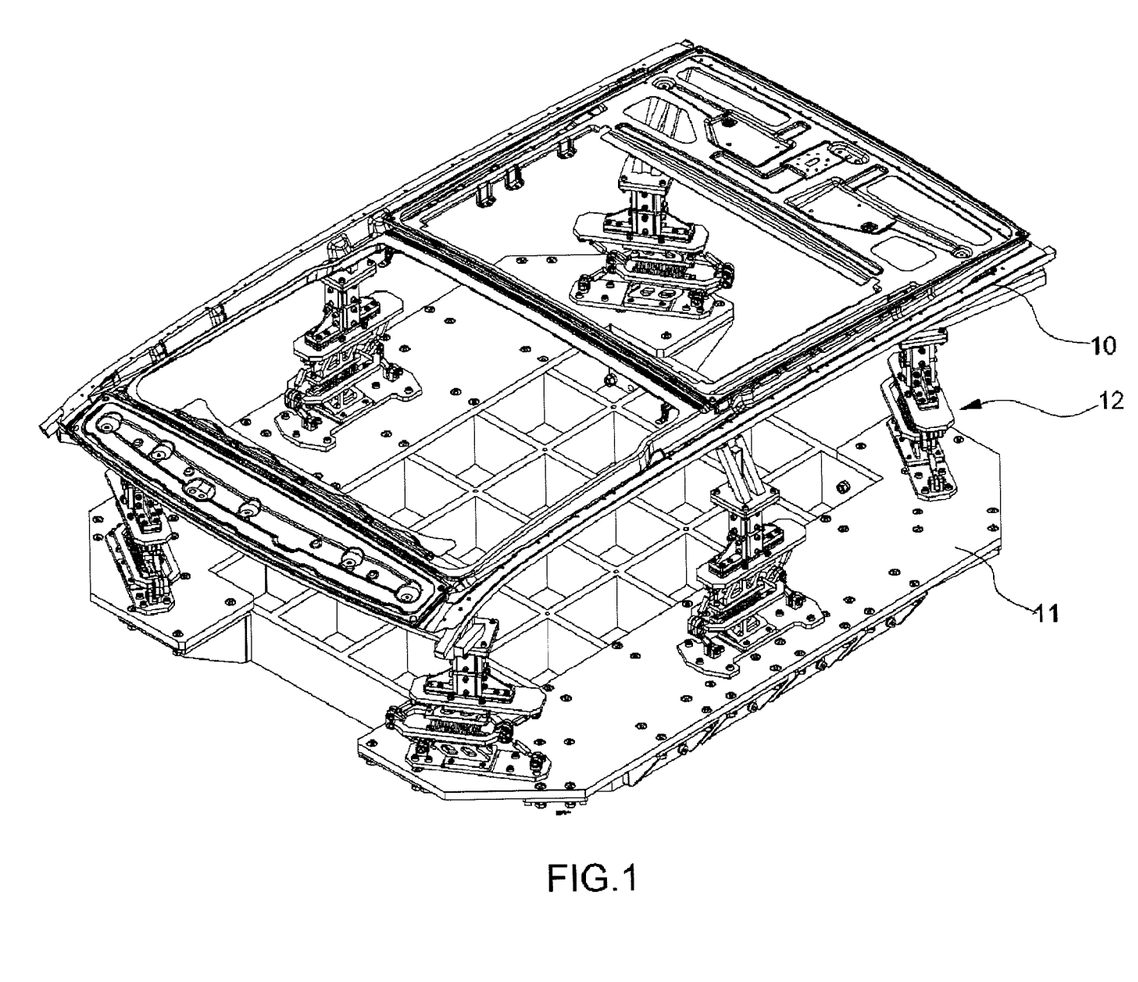
FIG. 1 is a perspective view showing an exemplary vibration test jig according to the present invention.

FIG. 1 is a perspective view showing a vibration test jig according to various embodiments of the present disclosure. As shown in FIG. 1, in the vibration test jig, a plurality of double parallelograms 12, for example, sixth double parallelograms 12 including springs and four-articulation complex links are installed at a lower end of a jig to which an object such as a panorama roof is mounted. That is, sixth double parallelograms 12 are installed between an upper jig frame 10 to which a vibration test object is fixed and a lower base frame 11 mounted to a shaker or oscillator.

Then, the plurality of double parallelograms 12 connected between the jig frame 10 and the base frame 11 are disposed to be perpendicular to a diagonal line passing through the center of weight of the vibration test jig, and are disposed to the contrary with respect to a forward/rearward direction.

The double parallelograms 12 are restricted by the four links such that five displacements, that is, displacements in the Tx, Ty, Rx, Ry, and Rz directions are limited but a displacement in the Tz direction is not restricted. For example, upper plates and lower plates of the double parallelograms have displacements in an upward/downward direction, and a stabilizer at the center thereof is operated forwards and rearwards.

That is, when being assembled, the upper plates and the lower plates of the double parallelograms are moved only upwards and downwards, and the central stabilizer bar is moved forwards and rearwards due to a reaction of the four-articulation link structure.

The important movements of the double parallelograms (a dual parallelogram structure) realize only an upward/downward displacement.

A displacement in one direction refers to an upward/downward direction Tz which is a relative displacement (an important displacement) between the upper plate and the lower plate.

Tx denotes a forward/rearward translation, Ty denotes a leftward/rightward translation, Tz denotes an upward/downward translation, and Ri denotes rotations in various directions.

The displacement restricting vibration test jig may cause vertical relative displacements of the parallelograms while the vibration test jig vibrates, in which case vibrations of an actual vehicle may be directly simulated while a displacement in another direction is restricted.

Unlike a general vibration test jig, the flexible vibration test jib may generate relative displacements at six points, and may cause various types of deformations (bending, torsion and the like) according to frequency and amplitude characteristics of basis oscillations through a semi-floating equipment mounting structure. By using the characteristics, desired types of deformations may be applied to an object.

Figure 2:
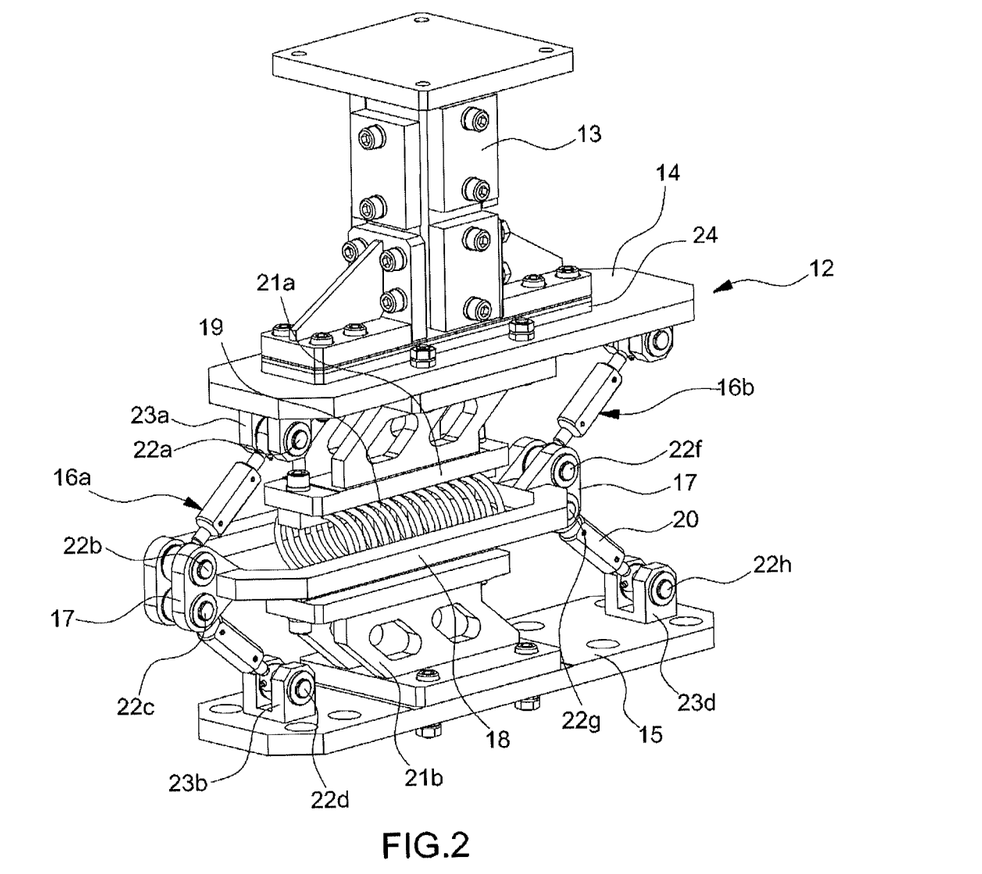
FIG. 2 is a perspective view showing an exemplary double parallelogram of an exemplary vibration test jig according to the present invention.
Figure 3:
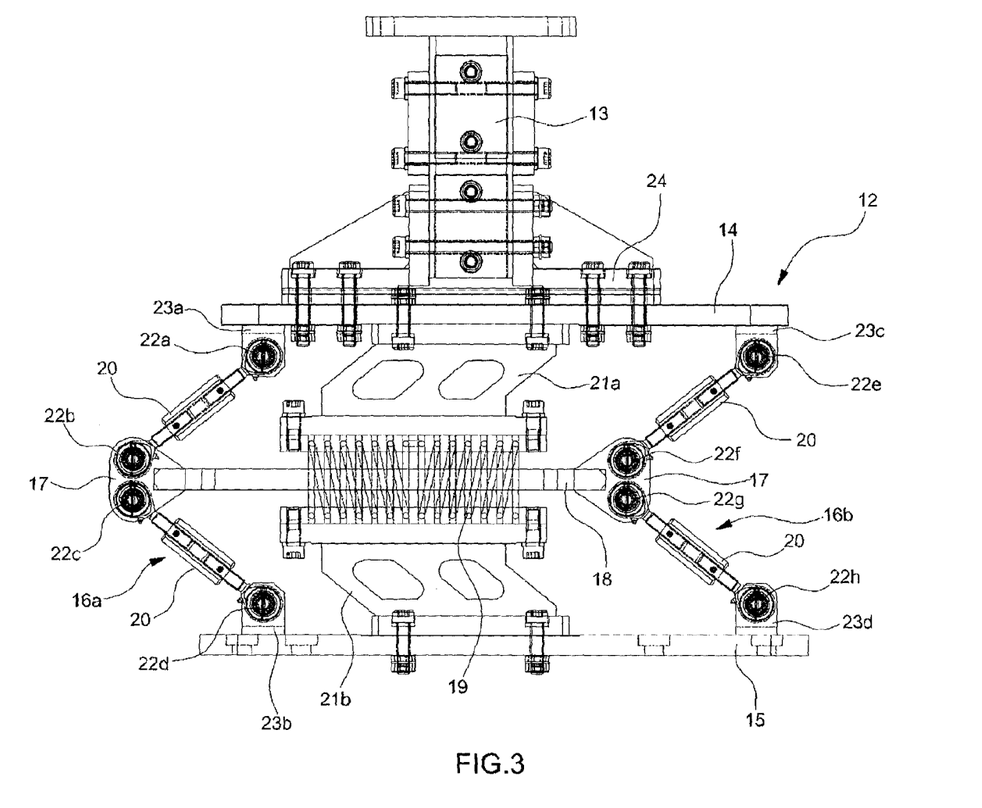
FIG. 3 is a front view showing an exemplary double parallelogram of an exemplary vibration test jig according to the present invention.

FIG. 2 is a perspective view showing a double parallelogram of the vibration test jig according to various embodiments of the present disclosure. FIG. 3 is a front view showing the double parallelogram of the vibration test jig according to various embodiments of the present disclosure. As shown in FIGS. 2 and 3, the double parallelogram 12 includes a complex four-link structure and a wire rope isolator means, and is installed between a jig frame 10 and a base frame 11 to simulate a deformation mode due to generation of a space while generating a vertical displacement.

Thereto, an upper plate 14 and a lower plate 15 are disposed to be vertically spaced apart from each other, and the upper plate 14 is fixed to the jig frame 10 and the lower plate 15 is fixed to the base frame 11.

A dummy mass 13 is installed on an upper surface of the upper plate 14 and the upper plate having the dummy mass 13 is fixedly coupled to a bottom surface of the jig frame 10 through the dummy mass 13.

Here, the dummy mass is used to correct an arrangement (inclination) due to a weight difference when a test object is positioned and to correct a resonance frequency combined with a spring stiffness by adjusting weight when a change in the weight of the test object is larger (a panorama roof of a large-sized vehicle, a panorama roof of a small-sized vehicle).

In particular, a pair (in some embodiments, may be two pairs) of four articulation links 16a and 16b for causing and restricting displacements by using a complex four-articulation link structure are provided. Each of the four-articulation links 16a and 16b corresponds to a combination of two link bars having pin support points at opposite ends thereof, in which case the two link bars form an inclined posture and opposite ends of the link bars are connected to the plate and a link sharing unit 17 of a stabilizer bar 18. In some embodiments, the link bars are of rod end bearing types for acting as links (rotations).

The pair of four articulation links 16a and 16b are disposed forwards and rearwards between the upper plate 14 and the lower plate 15 while taking a posture bent toward the same direction at a predetermined angle (a posture bent forwards), and then are connected to the plate via a pin structure.

The four-articulation links 16a disposed on the front side are connected to a pin bracket 23a on a bottom surface of the upper plate 14, two points of the link sharing unit 17 at a front end of the stabilizer bar 18, and a pin bracket 23b on an upper surface of the lower plate 14 by using connecting portions of four pins 22a to 22d.

The four-articulation links 16b disposed on the rear side are connected to and supported by a pin bracket 23c on a bottom surface of the upper plate 14, two points of the link sharing unit 17 at a rear end of the stabilizer bar 18, and a pin bracket 23d on an upper surface of the lower plate 14 by using connecting portions of four pins 22e to 22h.

Opposite ends of the four-articulation links 16a and 16b are connected to an adjustor 20 for adjusting a difference of lengths of links due to an assembly tolerance. That is, an intermediate lengthwise portion of the link bar having a rod end bearing is divided into two parts, and the adjustor 20 is located in parallel or substantially in parallel between the separated parts and the ends of the separated parts are screw-coupled to opposite ends of the adjustor 20 (one side is screwed by a right-hand screw and the other side is screwed by a left-hand screw). Accordingly, if the adjustor 20 is rotated, the screw-coupled portion is fastened or released to adjust the length of the link.

A stabilizer bar 18 is provided as a unit for dealing with an associated operation of the links while connecting the forward and rearward four-articulation links 16a and 16b. The stabilizer bar 18 has a bar shape having link sharing units 17 at opposite ends thereof, and is horizontally disposed at an intermediate location between the upper plate 14 and the lower plate 15 to be parallel or substantially in parallel to the plates. The front and rear four-articulation links 16a and 16b are connected by using the link sharing units 17 located on the front and rear sides.

That is, the stabilizer bar 18 is located between the bent portions of the front and rear four-articulation links 16a and 16b, in which state the front link sharing unit 17 is connected to the front four-articulation link 16a through two pins 22a and 22c and the rear link sharing unit 17 is connected to the rear four-articulation link 16b through two pins 22f and 22g. Accordingly, the two pairs of four-articulation links 16a and 16b and the stabilizer therebetween are operated in association with each other through linking.

Unlike the general four-articulation link structure, the stabilizer bar 18 has a detour structure which surrounds a wire rope isolator 19 to avoid interference when the central wire rope isolator 19 is compressed and tensioned.

That is, the stabilizer bar 18 is configured such that two rows of bars maintaining a predetermined separation are integrally connected to the link sharing units 17 at ends of the bars. Accordingly, the wire rope isolator 19 is located inside the two rows of bars forming the stabilizer bar 18 to avoid interference while being compressed.

The wire rope isolator 19 is provided to connect the upper plate 14 and the lower plate 15. In some embodiments, the wire rope isolator 19 is a spring, and is connected to a plate through a circumference of the spring while being laid aside as it is located in parallel to the plate along a forward and rearward lengthwise direction of the plate.

That is, a wire rope mounting member 21a extends downwards from a bottom surface of the upper plate 14 and a wire rope mounting member 21b extends upwards from an upper surface of the lower plate 14, and as an upper circumferential portion and a lower circumferential portion of the spring which is laid aside are fastened to a lower end and an upper end of the wire rope mounting members 21a and 21b, the upper plate 14 and the lower plate 14 are connected to each other by the wire rope isolator 19, that is, a spring.

The wire rope mounting members 21a and 21b are inclined. That is, the upper and lower wire rope mounting members 21a and 21b are bent forwards, and thus, leaning of a lower of the four-articulation link may be minimized by locating a spring at the center of the four-articulation link.

Thus, an operation state of the above-described vibration test jig will be described as follows.

Figure 4:
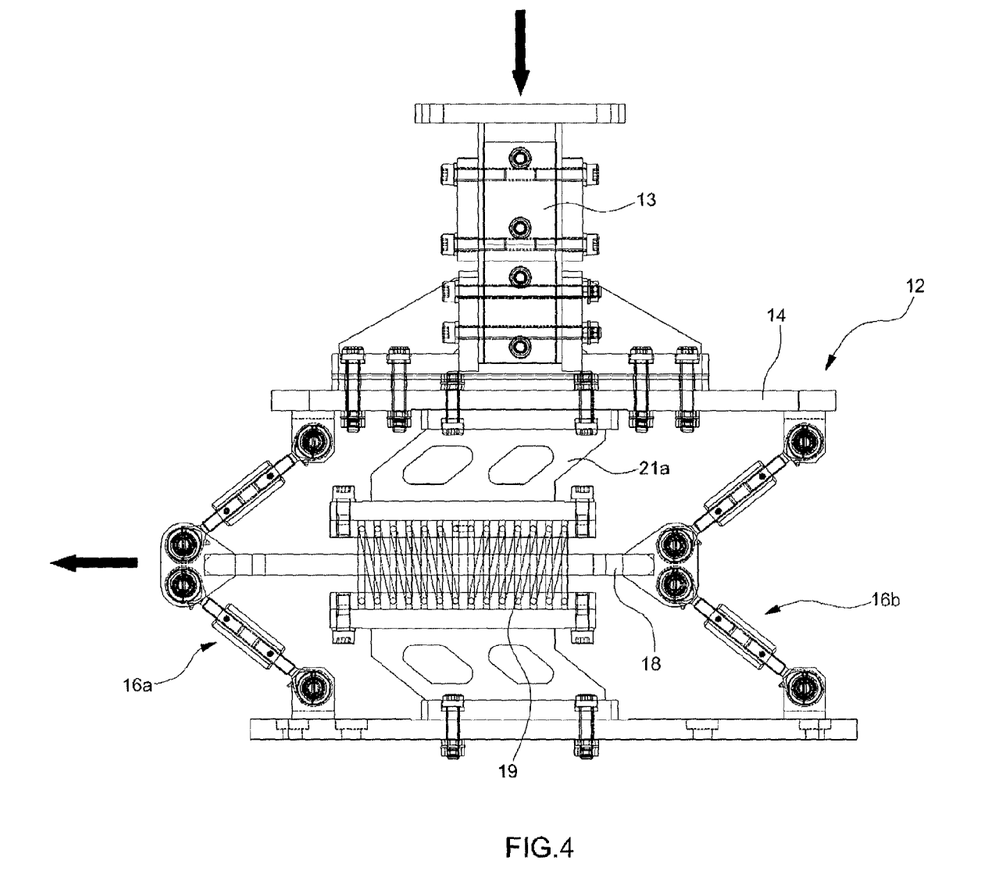
FIG. 4 is a front view showing an exemplary double parallelogram of an exemplary vibration test jig according to the present invention.
Figure 5:
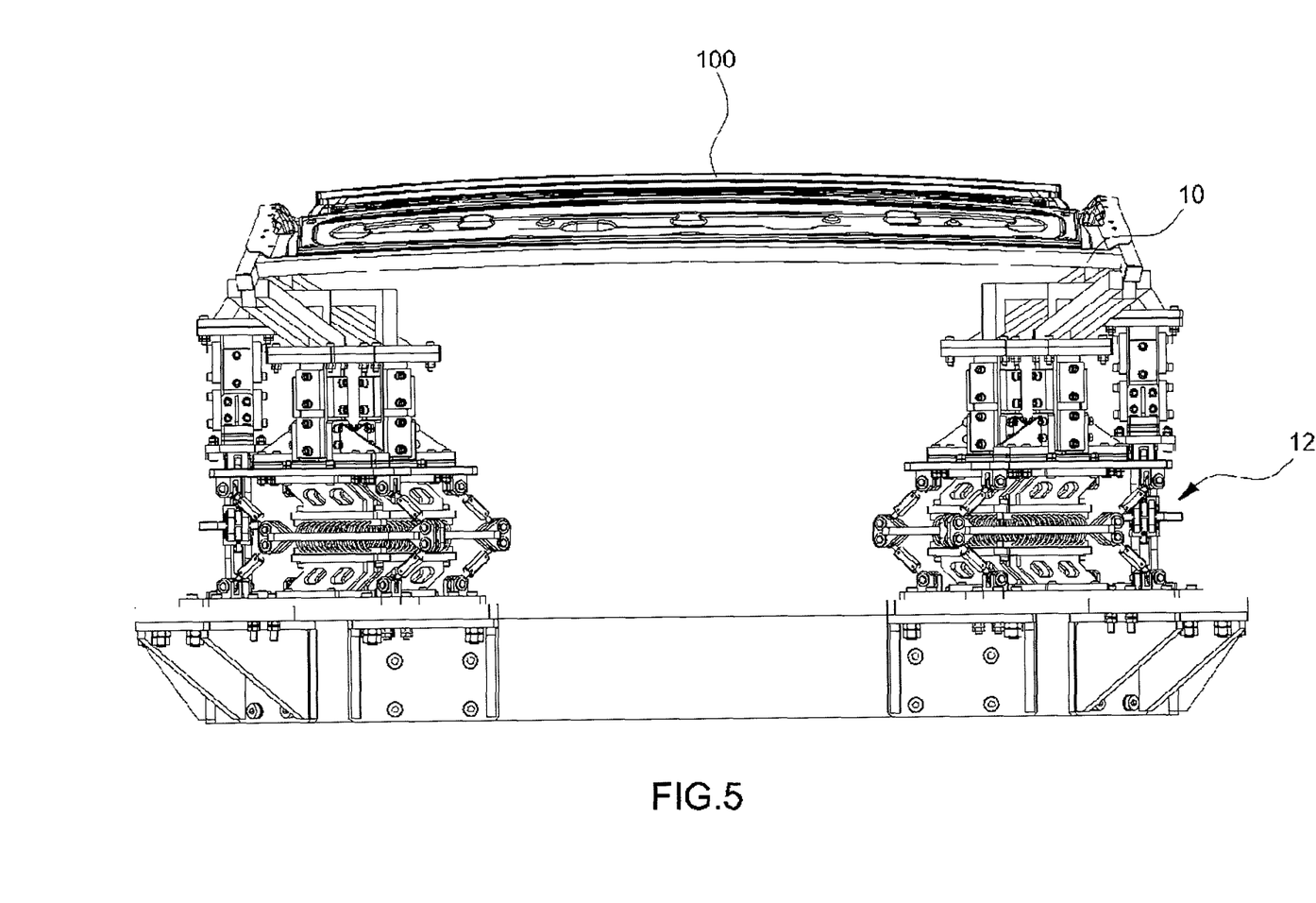
FIG. 5 is a front view showing an operation state of an exemplary vibration test jig according to the present invention.

FIG. 4 is a front view showing a double parallelogram of the vibration test jig according to various embodiments of the present disclosure. FIG. 5 is a front view showing an operation state of the vibration test jig according to various embodiments of the present disclosure.

As shown in FIGS. 4 and 5, according to an operation of the double parallelogram 12, if an upper portion of an object is pressed, the upper plate 14 is displaced vertically (Tz direction) and the stabilizer bar 18 is displaced horizontally (Tx direction), so that a rotation structure of a general four-articulation link may apply vertical displacements.

If the object 100 is oscillated while the object 100 is fixed to the jig frame 10, differences in relative displacements of the six double parallelogram 12 supporting the jig frame 10 including the object 100 are generated.

In this way, a vibration test may be performed while simulating a relative displacement such as torsion or bending introduced to an actual vehicle through the relative displacements of the six points.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vibration test jig comprising:
   an upper jig frame to which a vibration test object is fixed and a lower base frame mounted to an oscillator; and
   a plurality of double parallelograms connected between the jig frame and the base frame, wherein the plurality of double parallelograms generate displacements in an upward/downward direction or a forward/rearward direction,
   wherein each of the double parallelograms comprises:
      a pair of stacked parallelograms;
      an upper plate coupled to the jig frame;
      a lower plate fixed to the base frame;
      an articulation link structure that includes a pair of four-articulation links located between the upper plate and the lower plate and connected to the upper and lower plates through pins, wherein each of the articulation links are located at a respective vertex of the double parallelogram;

a stabilizer bar connected to the four-articulation links in the center of the double parallelogram by a pin structure using two link sharing units; and a wire rope isolator connected between the upper plate and the lower plate, wherein a deformation mode due to generation of resonances is simulated, and wherein the plurality of the double parallelograms are mounted at predetermined intervals on the base frame such that the vibration test jig causes vertical relative displacements of the double parallelograms while the vibration test jig vibrates.

2. The vibration test jig of claim 1, wherein the upper plate comprises a dummy mass supporting the jig frame.

3. The vibration test jig of claim 1, wherein the upper plate defines the top of the double parallelogram, the stabilizer bar defines the middle of the double parallelogram, the lower plate defines the bottom of the double parallelogram, and a four remaining sides of the double parallelogram are defined by adjustable link bars.

4. The vibration test jig of claim 1, wherein the stabilizer bar comprises two bars which are spaced apart, joined at their respective ends, and surround the wire rope isolator.

5. The vibration test jig of claim 1, wherein wire rope mounting members for mounting the wire rope isolators are provided in the upper plate and the lower plate, and the wire rope mounting members are inclined.

6. The vibration test jig of claim 1, wherein the plurality of double parallelograms between the jig frame and the base frame are disposed such that a length direction of each of the double parallelograms is substantially perpendicular to a line passing through a center of weight of the vibration test jig on a plane of the jig frame.

7. The vibration test jig of claim 5, wherein the upper and lower wire rope mounting members are bent forwards.

8. A vibration test jig comprising:

an upper jig frame to which a vibration test object is fixed and a lower base frame mounted to an oscillator; and a plurality of double parallelograms, for generating displacements in an upward/downward direction and a forward/rearward direction, connected to the jig frame and the base frame between the jig frame and the base frame, wherein each of the double parallelograms comprises:

a pair of stacked parallelograms;

an upper plate coupled to the jig frame;

a lower plate fixed to the base frame;

an articulation link structure that includes a pair of four-articulation links located between the upper plate and the lower plate and connected to the upper and lower plates through pins, wherein each of the articulation links are located at a respective vertex of the double parallelogram;

a stabilizer bar connected to the four-articulation links in the center of the double parallelograms by a pin structure using two link sharing units; and a wire rope isolator connected between the upper plate and the lower plate, wherein a deformation mode due to generation of resonances is simulated, and wherein the plurality of the double parallelograms are mounted at predetermined intervals on the base frame such that the vibration test jig causes vertical relative displacements of the double parallelograms while the vibration test jig vibrates.

* * * * *